Patented Aug. 6, 1946

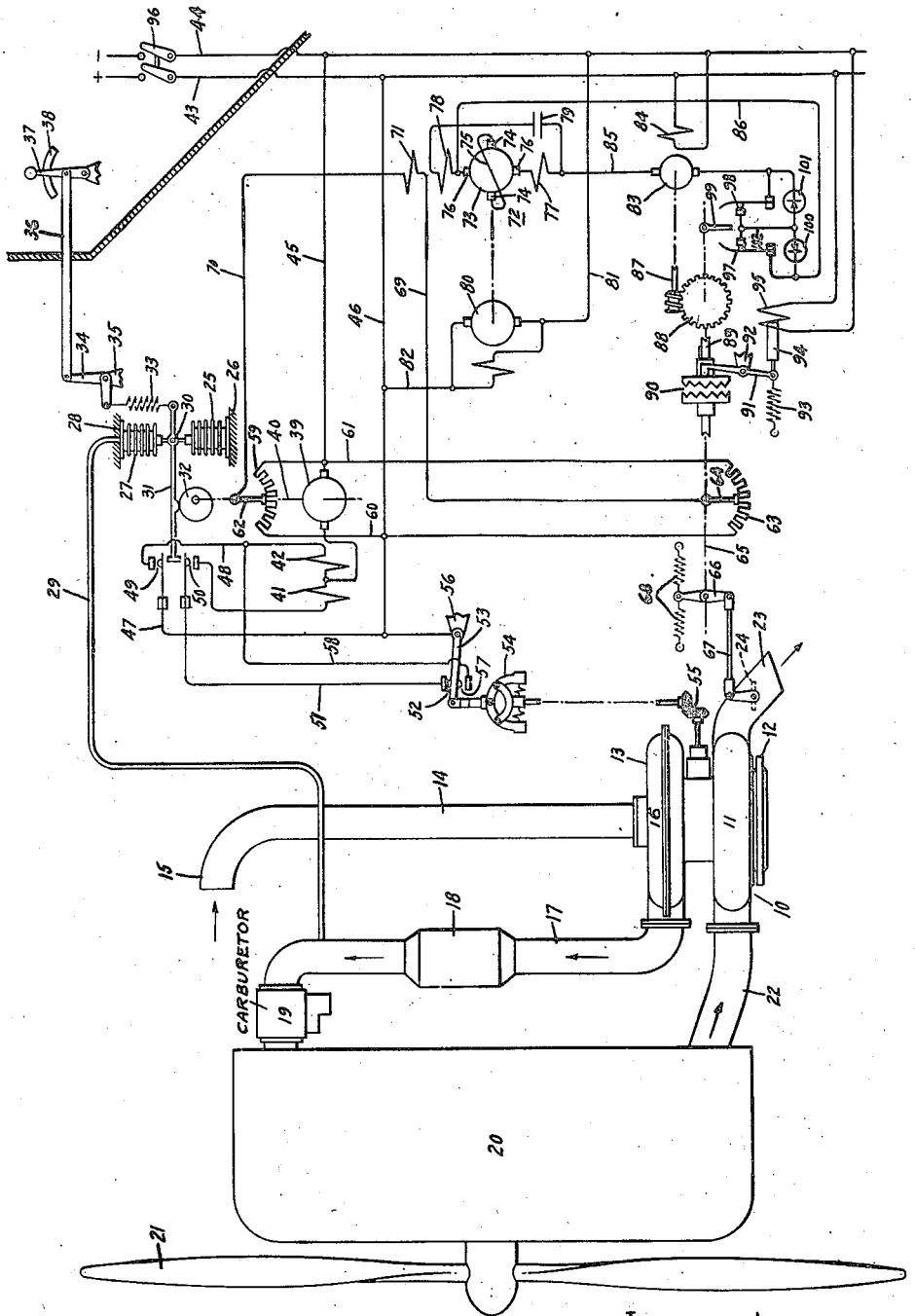

2,405,413

UNITED STATES PATENT OFFICE 2,405,413

AIRCRAFT SUPERCHARGER ARRANGEMENT

Martin A. Edwards, Scotia, N. Y., assignor to General Electric Company, a corporation of New York Application March 6, 1944, Serial No. 525,210

8 Claims. (Cl. 230—114)

The present invention relates to aircraft supercharger arrangements for supplying compressed air or like medium to a consumer such as an internal combustion engine or a cabin. Such superchargers may be driven by an exhaust gas-operated turbine in which case they are known as "turbosuperchargers," or they may be driven through variable speed gearing from a combustion engine or like motor. The turbine or motor for driving the supercharger ordinarily includes control means to vary the supercharger speed in order to maintain constant flow or pressure or like fluid condition in the supercharger outlet. On an aircraft the supercharger speed is increased with increasing altitude until it reaches a maximum desirable safe speed. Upon further increase in altitude or increased demand for compressed air it becomes then necessary to prevent increased speed, that is, to render the normal control means at least partly inoperative and to provide means for maintaining substantially constant speed.

The object of my invention is to provide an improved construction of aircraft supercharger arrangements including a control system whereby the operation of the supercharger is effectively and efficiently controlled and safe operation of the supercharger and the drive motor therefor is assured.

This is accomplished in accordance with my invention by an arrangement whereby the drive motor for the supercharger is controlled in response to changes of a condition such as pressure or flow in the supercharger outlet within a predetermined range of operation of the supercharger, for example, up to a maximum desirable safe speed. In addition, such arrangement includes speed-responsive means associated with the supercharger or the drive motor therefor for effecting control outside said operating range.

For a better understanding of what I believe to be novel and my invention, attention is directed to the following description and the claims appended thereto in connection with the accompanying drawing.

The single figure of the drawing illustrates a supercharger embodying my invention. In the present example the supercharger arrangement comprises a turbosupercharger including a turbine 10 having a nozzle box 11 and a turbine wheel 12 secured to an overhung shaft arranged to drive a compressor 13 having an inlet conduit 14 with a ram 15 facing in the direction of the slipstream and a scroll 16 connected by a conduit 17 with an intercooler 18 to a carburetor 19 of an internal combustion engine 20 for operating an aircraft propeller 21. The exhaust gases of the engine 20 are conducted by a conduit 22 to the nozzle box 11 of the turbine. During operation some of the exhaust gases conducted from the engine 20 to the nozzle box 11 are discharged therefrom through the turbine wheel 12. Another part of the exhaust gases is bypassed with regard to the turbine wheel 12 and discharged from the nozzle box 11 through a waste conduit 23 directly to atmosphere. The waste conduit 23 includes a butterfly valve or like control member 24 for controlling the flow of gases through the conduit 23 and thereby controlling the flow of gases through the turbine wheel 12 and accordingly the load output of the turbine. Assuming a constant flow through the conduit 22, the speed of the turbine and its load output may be increased upon closing of the valve 24 and, vice versa, opening of the valve 24 reduces the speed and the load output of the turbine. Air received by the ram 15 and conducted through the conduit 14 to the compressor 13 is compressed therein and discharged through the scroll 16 and conducted through the conduit 17 and the carburetor 19 to the engine 20.

The motor driven compressor or turbosupercharger is controlled in response to changes of an operating condition by means of a control mechanism for positioning the valve 24 comprising a device responsive to changes of a fluid condition in the conduit 17. In the present instance the condition-responsive device is in the form of an absolute pressure-responsive device including an evacuated bellows 25 secured at its lower end to a fixed support 26 and another bellows 27 secured at its upper end to a fixed support 28 and connected by a pipe 29 to the conduit 17. The adjacent ends of the bellows are connected by a pivot 30 to an intermediate point of a lever 31. Another point of the lever 31 is supported on a fulcrum 32 which in the present instance is in the form of a cam or eccentric and also serves as a restoring means, as will be more fully described hereinafter. The right-hand end of the lever 31 is connected by a spring 33 to one arm of a bellcrank 34 held on a fulcrum 35 and having another arm connected by a link 36 to an operating handle 37 associated with a quadrant 38. The lever 37 may be located in the pilot's compartment of an airplane to permit the pilot manually to control the supercharger.

A change in fluid pressure in the conduit 17 effects movement of the bellows 27 and turning movement of the lever 31 on the eccentric 32. Similarly, a change in altitude pressure effects movement of the bellows 25, resulting in turning movement of the lever 31 on the eccentric 32. Thus the lever 31 is moved in response to changes of the absolute pressure in the conduit 17.

The lever 31 is arranged to control the circuit of a reversing motor 39 of the split field series type having an armature secured to a shaft 40 and connected in series with fields 41 and 42 respectively energized from an electric D. C. line having conductors 43, 44. The conductor 44 is connected to the motor by a wire 45 and the conductor 43 is connected to either of the fields 41, 42 by a wire 46 which in turn is connected to the field 42 by wires 47, 48 including a pair of contacts or first contact means 49. The field 41 is connected through a pair of contacts 50 to a wire 51, to another normally closed pair of contacts or second contact means 52, a conductive lever 53, to the wire 46.

During operation, clockwise turning movement of the lever 31 effected by increase in absolute pressure in the conduit 17 causes closing movement of the contacts 49, thereby energizing the motor 39 through the field 42, causing rotation thereof in counterclockwise direction. The eccentric 32 is secured to the shaft 40 of the motor whereby rotation of the latter causes rotation of the eccentric, resulting in downward movement of the lever 31. Thus the eccentric 32 constitutes a means for restoring the left hand end of the lever 31 to its normal mid position between the pairs of contacts 49, 50. Upon decrease in absolute pressure in the conduit 17 the lever 31 is turned in counterclockwise direction about its support on the eccentric 32, thus causing closing of the contacts 50 and energization of the motor 39 through its other field 41 whereby the motor rotates in clockwise direction to effect increase in pressure in the conduit 17, as will be described hereinafter.

It will be noted that the field winding 41 is energized only as long as the contacts 52 are closed. Upon opening of said contacts the circuit for the motor 39 can no longer be closed to effect increase in pressure. On the other hand, the motor circuit may be closed to decrease the pressure. This is important as in aircraft the pressure can be maintained constant only up to a certain altitude. Above such altitude a decrease in pressure must be contended with in the interest of safe operation of the turbosupercharger because the latter cannot be safely operated above a certain speed.

In the present example I have provided means whereby the contacts 52 are automatically opened beyond a certain operating range of the turbosupercharger, more specifically above a certain speed of the turbine. In the specific embodiment these means are shown in the form of a speed-responsive device in the form of a centrifugal flyball type governor 54 driven from the turbosupercharger through gearing 55 and pivotally connected to the left-hand end of the lever 53, the right-hand end of which is supported on a fulcrum 56. Within a certain speed range the lever 53 is held in a position in which the contacts 52 are closed. Above said speed range the governor 54 moves the lever 53 downward, thus opening the contacts 52 and rendering the field 41 of the motor 39 inoperative without, however, affecting the circuit of the field 42 through the contacts 49, thus permitting operation of the mechanism to decrease the pressure in the conduit 17 by action of the absolute pressure-responsive device. Means are provided for bridging the contacts 49 if the speed of the turbosupercharger rises above a certain value. This means includes a pair of contacts or second contact means 57 below the lever 53. One of the contacts is held on or carried by the lever and the other contact is located below thereof and connected by a wire 58 to the wire 48. Thus, above a certain safe speed a circuit is formed for the motor 39 from the conductor 44 through the wire 45, the armature, the field 42, the wire 48, the wire 58, the contacts 57, the lever 53, and the wire 46 to the conductor 43. Hence, above the normal operating speed range the pressure in the conduit 17 may be reduced either by operation of the absolute pressure-responsive device 25, 27 effecting closing of the contacts 49 as well as by operation of the speed-responsive governor 54 effecting closing of the contact 57.

The motor 39, as pointed out above, acts to operate the follow-up device or eccentric 32. In addition, such motor forms part of a variable voltage means for producing an electrical differential or potential in response to changes of an operating condition, in the present instance the absolute pressure in the discharge conduit of the supercharger. This variable voltage means in the present instance comprises a variable resistor or potentiometer 59 connected by wires 60, 61 across the wires 45, 46 and having a contactor or contact arm 62 engaging the variable resistance and secured to be driven by the shaft 40 of the motor 39. In the present instance the contactor 62 engages the center of the resistance. Another variable resistance or potentiometer 63 forming a comparison circuit is connected in parallel to the resistance and has a contact arm 64 arranged to be driven by a shaft 65 for positioning the waste valve 24.

A lever 66 is secured to the shaft 65 and has a lower arm connected to the valve 24 by means of a link 67 and an upper arm connected to centering spring 68. The springs 68 move the valve 24 into open or safe operating position in case the valve is closed and the drive for the shaft 65 should fail or the shaft 65 should break. The contact arm 64 of the potentiometer or variable resistance 63 is held in mid position. As long as both arms 62, 64 are in the same position, for instance, in mid position, as shown in the drawing, no electrical differential is created between them. If, however, the arm 62 moves into a different position relatve to the arm 64, a differential or voltage is produced between them, and this electrical differential is used for operating a motor to position the valve 24. In the present example the contact arms 62, 64 are connected by wires 69, 70 to a control field 71 of an armature reaction excited dynamo electric machine 72 which has an armature 73 with a pair of brushes 74 short-circuited by a wire 75 and a pair of other brushes 76 spaced about 90 electrical degrees from the brushes 74 and connected in series with a compensating field 77. A stabilizing field 78 in series with a stabilizing capacitor 79 is connected in shunt to the armature 73 and the compensating field 77. The machine is controlled by the field 71 and its output is proportional to the potential impressed upon the field 71 by the potentiometers or variable voltage means 59, 63. For a better understanding of the dynamo electric machine or generator 72, attention is directed to U. S. Patent 2,227,992 of E. F. W. Alexanderson et al., issued January 7, 1941, and assigned to the same assignee as the present application.

The machine 72 is driven at substantially constant speed by means of a shunt motor 80 connected by wire 81 to the conductor 44 and by wires 82 and 46 to the conductor 43. The dynamo electric machine 72 with the motor 80 broadly constitute electrical amplifying means or an amplifier receiving its controlling input from the potentiometers and furnishing electrical energy for operating an electric motor 83 for positioning the valve 24. The motor 83 has a foreign excited field 84 connected across the conductors 43, 44 and an armature connected in parallel to the armature of the machine 72 by means including wires 85 and 86.

The motor 83 has a shaft 87 connected by a speed-reducing gearing 88 to a shaft 89 which in turn is connected to the shaft 65 by a coupling 90 having a left-hand half secured to the shaft 65 and a right-hand half splined to the shaft 89 and arranged to be operated by a forked lever 91 held on a fulcrum 92. The lever is biased towards opening position of the coupling by a spring 93 and may be forced towards closing position of the coupling by a relay 94 having an energizing coil 95 connected across the conductors 43, 44.

The conductors 43, 44 are connected to a source of electric energy by means of a switch 96. Upon closing of the switch 96 the field winding 84 of the valve controlling motor 83 is energized; the relay coil 95 is energized and causes engagement of the coupling 90; and the motor 80 is energized and causes rotation of the dynamo electric machine 72 at substantially constant speed. As long as the condition of the fluid in the discharge of the turbosupercharger is maintained substantially constant the system is in balanced condition, the arms 62, 64 are in parallel and the voltage between them is zero, the circuit of the motor 39 is open, and as no potential is impressed on the control field 71 of the dynamo electric machine 72, no current flows through its brushes 76 to the valve control motor 83 and the latter is at rest. If now, for example, the absolute pressure in the conduit 17 increases, the bellows 27 expands and, as described above, causes operation of the motor 39 in counterclockwise direction. The latter thereby effects turning movement of the contact arm 62, thus creating a potential differential across the control field 71, resulting in an output of the dynamo electric machine 72 supplied to the valve control motor 83. Rotation of the motor 83 effects positioning of the valve 24 and simultaneously causes movement of the contact arm 64. This operation continues until the contact arm 64 has reached a follow-up position parallel to the contact arm 62 in which current no longer flows through the control field 71. Thus, operation of the valve control motor 83 effects positioning of the valve and in addition follow-up action of the contactor 64.

In case of increase in pressure the valve 24 is moved towards opening position to reduce the speed of the turbine as described above.

Upon opening of the valve 24 the contact arm 64 is turned counterclockwise and vice-versa. In order to prevent straining of the mechanism it is desirable to disconnect the valve control motor 83 in the end positions of the valve 24, that is, when the valve is fully opened or closed. This is accomplished by the provision of limit switches 97 and 98 in the circuit of the motor 83 controlled by an arm 99 connected to the shaft 89. In the waste gate opening position the arm 99 opens the limiting switch 98 and in the waste gate closing position the arm 99 opens the limiting switch 97. When the waste gate is fully open and the arm 99 has opened the limiting switch 98, it is not possible to operate the motor 83 in a direction to effect further opening of the waste gate. On the other hand, it is necessary to operate the motor 83 in a direction to close the waste gate. This is accomplished by the provision of one-way electrical valves 100 and 101 connected across or bridging the limiting switches 97 and 98 respectively. Thus, if limiting switch 98 is open, a one-way circuit is formed from the wire 86 through the limiting switch 97, a wire 102, the valve 101, to the armature of the motor 83 permitting the control mechanism to move the waste gate 23 away from its end position. Vice versa, if the valve or waste gate 23 is in its other end position and the limiting switch 97 is opened, another one-way circuit is formed for current flow in the opposite direction from that described above. This last mentioned circuit may be traced from the motor 83 through the limiting switch 98, the wire 102 and the one-way valve 100 to the wire 86.

Thus, with my invention I have accomplished an improved construction and arrangement of aircraft superchargers and control mechanisms therefor whereby a condition of the supercharger or the turbine or motor for driving it may be maintained constant within a certain speed range of the supercharger and whereby at the upper limit of such speed range the speed is maintained substantially constant. The provision of an electrical control mechanism including electrical amplifying means is advantageous in aircraft operation as compared with hydraulic mechanisms in view of the considerable changes in viscosity of the operating medium in the latter during operation. The particular mechanism described has the further advantage of permitting the elimination of a droop or slight change in pressure or like condition being controlled, thus permitting the pressure or other condition to be maintained actually constant. In this respect the control mechanism is of the so-called isochronous type and may be advantageously employed in other arrangements where isochronous control is desired. The particular arrangement described includes various features rendering it safe during operation in case certain elements should be damaged or destroyed. One of these features, as pointed out above, is the provision of the centering springs 68 for moving the turbine valve 24 into wide open position or safe operating position in case the drive shaft 65 should break or the clutch 90 should fail. If the pressure control should fail, the valve 24 may still be controlled to prevent excess speed by the speed governor and it may be additionally controlled to increase or decrease the speed manually by means of the handle 37 in the pilot's compartment. Also, if the speed governor should fail, the pressure governor will continue to function to decrease the pressure or like condition of the supercharger but will no longer function to increase the pressure or like condition and accordingly the speed of the supercharger.

In the specific embodiment described above the supercharger is normally controlled in response to changes of an operating condition of the fluid flowing therethrough. Obviously the control mechanism may be employed to control the supercharger in response to changes of an operating condition of the turbo or drive motor for the supercharger. For example, in case of a turbosupercharger the control mechanism may include means responsive to pressure changes in the nozzle box. An arrangement of this kind is disclosed in the application of D. R. Shoults, filed March 31, 1942, Serial No. 437,097, and assigned to the same assignee as the present application. Also, in case of superchargers driven through a turbo type hydraulic gear from the engine, the control mechanism may be arranged to control the fluid flow to the turbo type gear as disclosed in the copending application of W. E. Johnson, Serial No. 428,570, filed January 28, 1942, and assigned to the same assignee as the present application.

Broadly, the pressure responsive device 25, 27 constitutes a means responsive to changes of an operating condition of a motor driven supercharger, more specifically the device 25, 27 is responsive to changes of a pressure appurtenant to an operating condition of a motor driven supercharger. The control mechanism according to my invention, as described above, generally includes a device responsive to changes of an operating condition of a machine to be controlled together with variable voltage means controlled by the device and electrical amplifying means having a control element connected to the variable voltage means. The latter includes a motor for operating a contact arm of a resistor. This motor is of the reversing type and has a circuit with first and second contact means. The first contact means, in the above example the contacts 49, 50, are controlled by the device 25, 27 and the second contact means 52, 57 are controlled by a speed responsive device 54 arranged to take away at least partly the control from the device 25, 27 above a predetermined maximum safe speed of the machine to be controlled.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Turbo-compressor arrangement including the combination of a compressor, a motor having a control element for driving the compressor, and a control mechanism for the element comprising a device responsive to pressure changes appurtenant to an operating condition of the arrangement, variable voltage means including a reversing motor, a circuit including contact means for said reversing motor, a lever operated by the device cooperatively associated with contact means to control the reversing motor circuit, follow-up means between the reversing motor and the lever and potentiometer means for connection to an electrical source and including a contact arm positioned by the reversing motor, and electrical means including an amplifier having a control element connected to the potentiometer means for positioning said element.

2. Turbo-compressor arrangement including the combination of a compressor, a motor having a control element for driving the compressor, and a control mechanism for the element comprising a device responsive to pressure changes appurtenant to an operating condition of the arrangement, variable voltage means including a reversing motor, a circuit including contact means for said reversing motor, a lever operated by the device cooperatively associated with contact means to control the reversing motor circuit, follow-up means between the reversing motor and the lever, and potentiometer means having a contact arm positioned by the reversing motor, an armature reaction excited dynamo electric machine having a control field connected to the potentiometer means, a power agency for driving the dynamo electric machine at substantially constant speed, and means including a separate motor energized from the dynamo electric machine for positioning said element.

3. Turbo-compressor arrangement including the combination of a compressor, a motor having a control element for driving the compressor, and a control mechanism for the element comprising a device responsive to pressure changes appurtenant to an operating condition of the arrangement, variable voltage means including a reversing motor, a circuit including contact means for said reversing motor, a lever operated by the device for operating the contact means to control the reversing motor circuit, follow-up means between the reversing motor and the lever, and potentiometer means including a contact arm positioned by the reversing motor, a dynamo electric machine having a control field connected to the potentiometer means, a power agency for driving the dynamo electric machine at substantially constant speed, and means including a separate control motor energized from the dynamo electric machine for positioning said element, said potentiometer means including another contact arm driven from the control motor to follow up the movement of the first mentioned contact arm.

4. Turbo-compressor arrangement including the combination of a compressor, drive means including a control element for the compressor, and a control mechanism for the element to maintain substantially constant a fluid condition in the compressor within a predetermined speed range thereof and to maintain substantially constant speed outside said range, said mechanism comprising a device responsive to pressure changes appurtenant to an operating condition of the compressor, variable voltage means actuated by said device and including a motor with a circuit controlled by said device, and a potentiometer means with a first contact arm driven by the motor and a second contact arm connected to said element, electrical amplifying means having a control field connected to the contact arms and a separate motor energized from the amplifying means for positioning said element.

5. Turbo-compressor arrangement including the combination of a compressor, drive means including a control element for the compressor, and a control mechanism for the element to maintain substantially constant a fluid condition in the compressor within a predetermined speed range thereof and to maintain substantially constant speed outside said range, said mechanism comprising a device responsive to pressure changes appurtenant to an operating condition of the compressor, variable voltage means actuated by said device and including a motor with a circuit controlled by said device, and a potentiometer with a contact arm driven by the motor and another potentiometer with a contact arm connected to said element, electrical amplifying means having a control field connected to the contact arms, a separate motor energized from the amplifying means for positioning said element, and a device responsive to speed changes of the compressor for controlling the circuit of said first mentioned motor at a predetermined maximum speed of the compressor.

6. Governing mechanism for compressors and like machines subject to varying pressure and speed conditions during operation comprising a pressure responsive device, variable voltage means actuated by the pressure responsive device and including a reversing motor having a circuit controlled by the device and a resistor with a contact arm driven by the motor, electrical amplifying means connected to the resistor, and a separate control motor energized from the amplifying means.

7. Governing mechanism for compressors and like machines subject to varying pressure and speed conditions during operation comprising a pressure responsive device, variable voltage means comprising a resistor with a contact arm and a reversing motor for operating the contact arm, said motor having a circuit with first and second contact means, the first contact means being controlled by the pressure responsive device, speed responsive means for controlling the second contact means to take away the control from the pressure responsive device above a predetermined maximum safe speed, electrical amplifying means having an element connected to the resistor, and a separate control motor energized from the amplifying means.

8. A governing mechanism for motor driven compressors and like machines subject to varying pressure and speed conditions during operation, comprising a pressure responsive device sensitive to a control pressure appurtenant to the operation of the machine, electrical control mechanism for the driving motor including potentiometer means arranged to be actuated by the pressure responsive device and electrical amplifying means connected with the potentiometer and arranged to control the machine to increase or decrease the control pressure in accordance with the signal received from the potentiometer, and an overspeed governor associated with the machine and including a speed responsive device arranged to actuate first and second contact means in circuits associated with the potentiometer, the speed responsive device being arranged to disengage the first contact means at a predetermined high speed to prevent further actuation of the potentiometer to signal for increased pressure and being arranged to engage the second contact means at a predetermined higher speed to actuate the potentiometer to produce a signal for decreased pressure.

MARTIN A. EDWARDS.